United States Patent
Payne et al.

(10) Patent No.: US 7,374,736 B2
(45) Date of Patent: May 20, 2008

(54) METHOD TO REDUCE FLUE GAS NOX

(75) Inventors: Roy Payne, Mission Viejo, CA (US); Wei Zhou, Foothill Ranch, CA (US); Vitali Victor Lissianski, San Juan Capistrano, CA (US); Vladimir M. Zamansky, Oceanside, CA (US); Larry William Swanson, Laguna Hills, CA (US)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 10/705,820

(22) Filed: Nov. 13, 2003

(65) Prior Publication Data

US 2005/0106516 A1 May 19, 2005

(51) Int. Cl.
*B01D 53/56* (2006.01)
(52) U.S. Cl. .................................... 423/235
(58) Field of Classification Search ............... 423/235
See application file for complete search history.

(56) References Cited

U.S. PATENT DOCUMENTS

| | | | |
|---|---|---|---|
| 4,196,173 A | 4/1980 | deJong et al. | |
| 4,233,274 A | 11/1980 | Allgulin | |
| 4,273,747 A | 6/1981 | Rasmussen | |
| 4,814,152 A | 3/1989 | Yan | |
| 4,843,102 A | 6/1989 | Horton | |
| 5,141,724 A | 8/1992 | Audeh et al. | |
| 5,409,522 A | 4/1995 | Durham et al. | |
| 5,413,477 A | 5/1995 | Moreland | |
| 5,572,938 A | 11/1996 | Leger | |
| 5,695,726 A | 12/1997 | Lerner | |
| 5,787,823 A | 8/1998 | Knowles | |
| 6,027,551 A | 2/2000 | Hwang et al. | |
| 6,048,510 A * | 4/2000 | Zauderer | 423/235 |
| 6,206,685 B1 | 3/2001 | Zamansky et al. | |
| 6,258,336 B1 * | 7/2001 | Breen et al. | 423/239.1 |
| 6,280,695 B1 | 8/2001 | Lissianski et al. | |
| 6,451,094 B1 | 9/2002 | Chang et al. | |
| 6,471,506 B1 | 10/2002 | Zamansky et al. | |
| 6,474,271 B1 * | 11/2002 | Widmer et al. | 122/405 |
| 6,521,021 B1 | 2/2003 | Pennline et al. | |
| 6,558,454 B1 | 5/2003 | Chang et al. | |
| 6,595,147 B2 | 7/2003 | Teller et al. | |
| 6,604,474 B2 | 8/2003 | Zamansky et al. | |
| 6,719,828 B1 | 4/2004 | Lovell et al. | |
| 2001/0041157 A1 | 11/2001 | Spokoyny | |
| 2002/0029690 A1 | 3/2002 | Ridgeway et al. | |
| 2002/0095866 A1 | 7/2002 | Hassett | |
| 2002/0102189 A1 | 8/2002 | Madden et al. | |
| 2002/0166484 A1 | 11/2002 | Zamansky et al. | |
| 2002/0170431 A1 | 11/2002 | Chang et al. | |
| 2003/0005634 A1 | 1/2003 | Calderon et al. | |
| 2003/0009932 A1 | 1/2003 | Kobayashi et al. | |
| 2003/0079606 A1 | 5/2003 | Katz | |
| 2003/0091490 A1 | 5/2003 | Nolan et al. | |
| 2003/0091948 A1 | 5/2003 | Bool, III et al. | |
| 2003/0099912 A1 | 5/2003 | Kobayashi et al. | |
| 2003/0099913 A1 | 5/2003 | Kobayashi et al. | |
| 2003/0104328 A1 | 6/2003 | Kobayashi et al. | |
| 2003/0104937 A1 | 6/2003 | Sinha | |
| 2003/0108470 A1 | 6/2003 | Spencer et al. | |
| 2003/0108833 A1 | 6/2003 | Kobayashi et al. | |
| 2003/0110994 A1 | 6/2003 | Lissianski et al. | |
| 2003/0143128 A1 | 7/2003 | Lanier et al. | |
| 2003/0147793 A1 | 8/2003 | Breen et al. | |
| 2003/0154858 A1 | 8/2003 | Kleut et al. | |
| 2003/0185718 A1 | 10/2003 | Sellakumar | |
| 2004/0011057 A1 | 1/2004 | Huber | |

OTHER PUBLICATIONS

"Kinetic Models For Predicting the Behavior Of Mercury In Coal-Fired Power Plants", C. Senior, et al., ACERC Annual Conference, Feb. 19-20, 2003, pp. 1-22.
"Evaluating The Effects of Low-NOx Retrofits on Carbon In Ash Levels[1]", K.A. Davis, et al. Presented at the Mega Symposium: EPRI-DOE-EPA Combined Utility Air Pollutant Control Symposium, Atlanta, GA, Aug. 1999, pp. 1-15.
"Behavior of Mercury In Air Pollution Control Devices on Coal-Fired Utility Boilers[1]" Constance L. Senior, Prepared For Power Production in the 21st Century: Impacts of Fuel Quality and Operations, Engineering Foundation Conference, Snowbird, UT, Oct. 28-Nov. 2, 2001, pp. 1-17.
"Loss On Ignition In Coal Combustion Simulations", Stefan P. Domino et al., pp. 1-49 (1999).
Reaction Engineering International brochure "Furnace Performance", Reaction Engineering International, printed from REI website on Aug. 22, 2003, pp. 1-2.
"Comparison of Photoacoustic Methods To Loss-On-Ignition and Foam Index Tests In Fly Ash Evaluations", Robert Novack, et al., pp. 1-2 (1997).
"Combustion Optimization Using MPV Systems", Mark Khesin, et al., Pittsburgh Coal Conference, Sep. 2000, pp. 1-4.
"Reburn Systems", GE Power Systems, Air Quality Systems & Services, pp. 1-3, GEA-13207 (2001).
"FlamemastEER™ Low $NO_x$ Burners", GEA-13132, p. 1, printed Dec. 2003.

(Continued)

*Primary Examiner*—Edward M. Johnson
(74) *Attorney, Agent, or Firm*—Nixon & Vanerhye P.C.

(57) ABSTRACT

A method of decreasing the concentration of nitrogen oxides in a combustion flue gas in which a nitrogen reducing agent is introduced together with the overfire air to mixes with the products of primary combustion along with the overfire air. The nitrogen agent reduced NOx as it passes through the temperature regime that is optimum for the NOx reduction as overfire air and flue gas mix. The transition from low to high temperature effectively eliminates ammonia slip. Additionally, the nitrogen agent may be mixed with the overfire air stream in such a manner that it is optimally shielded from early mixing with the products of primary combustion, where a portion of the overfire air reacts initially with any residual carbon monoxide (CO) that would otherwise interfere with the NOx reduction chemistry.

24 Claims, 5 Drawing Sheets

OTHER PUBLICATIONS

"$NO_x$ Control for Gas Turbines", GE Power Systems, pp. 1-2, printed Dec. 17, 2003.

"$NO_x$ Control for Boilers", GE Power Systems, pp. 1-2, printed Dec. 17, 2003.

"Coalogic™", GE Power Systems, pp. 1-2, printed Dec. 17, 2003.

"Coal Balancing & Blending", GE Power Systems, pp. 1-2, printed Dec. 17, 2003.

"$NO_x$ Reduction", Hamon, pp. 1-2, Dec. 8, 2003.

"Selective Catalytic Reduction (SCR)", Hamon, pp. 1-2, printed Dec. 8, 2003.

"Selective Non-Catalytic Reduction (SNCR)", Hamon, pp. 1-3, printed Dec. 8, 2003.

"SCR SNCR Hybrid System", Hamon, pp. 1-2, Dec. 8, 2003.

"Evaluation of the Effect of SCR NOx Control Technology on Mercury Speciation", Feeley, III et al., Mar. 2003, pp. 1-11.

John H. Pavlish et al., "Status Review Of Mercury Control Options For Coal-Fired Power Plants", pp. 89-165, Fuel Processing Technology 82 (2003).

Thomas D. Brown et al., "Mercury Measurement And Its Control: What We Know, Have Learned, and Need To Further Investigate", Journal of the Air & Waste Management Association, pp. 628-640, vol. 49, Jun. 1999.

Blair A. Folsom et al, "Combustion Modification—An Economic Alternative for Boiler $NO_x$ Control", GE Power Systems, GER-4192, pp. 1-8, Apr. 2001.

R. Sehgal et al., "Intelligent Optimization of Coal Burning to Meet Demanding Power Loads, Emission Requirements, and Cost Objectives", GE Power Systems, GER-4198, pp. 1-14, Oct. 2000.

The Washington Post, "Limiting Mercury Pollution Is Focus of Hot Debate", pp. A3, Mar. 15, 2004.

* cited by examiner

| Flue Gas Temp (F) | Initial OFA Temp (F) | NSR | Droplet Diam. (micron) | CO (ppm) | NOx Reduction % |
|---|---|---|---|---|---|
| 2500 | 560 | 1.94 | 60* | 0 | 25 |
| 2700 | 560 | 1.94 | 60* | 0 | 10 |
| 2500 | 560 | 1.94 | 100* | 0 | 9 |
| 2700 | 560 | 1.94 | 100* | 0 | 6 |
| 2500 | 560 | 1.94 | 3* | 0 | 50 |
| 2635 | 574 | 1.74 | 3* | 200 | 5 |
| 2435 | 450 | 1.74 | 3* | 200 | 30 |
| 2635 | 574 | 1.74 | 83** | 200 | 8 |
| 2435 | 450 | 1.74 | 83** | 200 | 21 |

\* Monodisperse droplet size distribution
\*\* Droplet size distribtution from a twin-fluid atomizer

*Fig. 7*

METHOD TO REDUCE FLUE GAS NOX

BACKGROUND OF THE INVENTION

This invention relates to nitrogen oxide (NOx) emission controls for combustion systems such as boilers, furnaces, incinerators and other large combustion systems (collectively referred to herein as "boilers"). In particular, the invention relates to reduction of NOx emissions by selective reduction of nitrogen oxides to molecular nitrogen.

Emissions of smoke from boilers are eliminated or at least greatly reduced by the use of overfire air (OFA) technology. OFA stages the combustion air such that most of the air flows into a primary combustion chamber of the boiler and a portion of the combustion air is diverted to a burnout zone, downstream of the flame. OFA air facilitates combustion of smoke particles and smoke particle precursors.

Other types of air pollutants produced by combustion include oxides of nitrogen, mainly NO and $NO_2$. Nitrogen oxides (NOx) are the subject of growing concern because of their toxicity and their role as precursors in acid rain and photochemical smog processes. There is a long felt need for cost-effective techniques to reduce NOx emissions generated by boilers.

A conventional NOx reduction technique is Selective Non-Catalytic Reduction (SNCR) that injects a nitrogen agent into the flue gas under conditions that cause a non-catalytic reaction to selectively reduce NOx to molecular nitrogen. The NOx reduction is selective because much of the molecular oxygen in the flue gas is not reduced. In SNCR, a nitrogen bearing reagent, e.g. $HN_3$, urea, or an amine compound, is injected into the flue gas stream at a temperature optimal for the reaction of $NH_2$ and NH radicals with NO reducing it to molecular nitrogen. The optimum temperature for such reactions is centered at approximately 1800° F. At substantially higher temperatures, the reagent can be oxidized to NO. At substantially lower temperatures, the reagent may pass through the flue gases unreacted, resulting in ammonia slip. An optimal range of temperatures to reduce NOx using SNCR methods is narrow and generally about 1600° F. to about 2000° F., wherein "about" refers to a temperature difference of plus or minus 25 degrees.

Flue gases reach temperatures well above 2000° F., but cool as they flow through the boiler. To allow the flue gases to cool before the nitrogen agent is released, schemes have been developed to inject relatively large droplets or particles of the agent into the flue gas, such as with the overfire air. The large droplets and particles are sized so as to release the nitrogen agent after the flue gas has cooled. See U.S. Pat. No. 6,280,695. The large droplets delay the release of the reagent in the flue gas stream until the bulk temperature of the flue gas cools to a temperature window of about 1600° F. to 2000° F.

BRIEF DESCRIPTION OF THE INVENTION

The present invention, in one embodiment, provides for a process for removing nitrogen oxides by injecting reducing agent into a gas stream while simultaneously minimizing ammonia slip. In a first embodiment, the invention is a method of decreasing the concentration of nitrogen oxides in a combustion flue gas including the steps of: forming a combustion flue gas in a combustion zone; providing overfire air and droplets of a solution or a gas of a selective reducing agent in a burnout zone, the droplets having a small average size to promote fast reduction of the nitrogen oxides; mixing the overfire air and the selective reducing agent with the combustion flue gas in the burnout zone at a temperature above an optimal temperature range for reduction of the nitrogen oxides in the flue gas; as the combustion flue gas heat the overfire air and the selective reducing agent to the optimal temperature range, reducing the nitrogen oxides with the reducing agent, and continuing to increase the temperature of the overfire air and the selective reducing agent beyond the optimal temperature range with the flue gas.

The invention may also be embodied as a method of decreasing the concentration of nitrogen oxides in a combustion flue gas, comprising: forming a combustion flue gas in a combustion zone, the combustion flue gas comprising nitrogen oxides; providing overfire air and droplets of an aqueous solution or gas of a selective reducing agent in a burnout zone, the droplets or gas having an initial average size of less than 50 microns, and contacting the combustion flue gas with the overfire air and the selective reducing agent in the burnout zone to decrease the concentration of nitrogen oxides therein.

The invention may further be embodied as a combustion apparatus for combusting comprising: a boiler defining an enclosed flue gas path having a combustion zone and a burnout zone, wherein flue gas is formed in the combustion zone and the combustion flue gas comprising nitrogen oxides; a fuel injector aligned with an introducing fuel into the combustion zone and a combustion air injector aligned with and introducing air into the combustion zone; an overfire air system adjacent the burnout zone comprising an overfire air port adjacent the burnout zone and through which overfire air flows into the burnout zone; a nitrogen reagent injector having an outlet aligned with the overfire air system and injecting nitrogen reagent gas or small droplets into said overfire air, wherein said small droplets have an average diameter of no greater than 50 microns.

BRIEF DESCRIPTION OF THE DRAWINGS

FIG. 7 is a table of computer generated predictions of NOx emission reductions for various nitrogen agent droplet sizes, flue gas temperatures and other boiler operating parameters.

DETAILED DESCRIPTION OF THE INVENTION

A gaseous or small droplet (less than 50 micron in diameter) nitrogen bearing reagent (a "nitrogen agent") is introduced with staged combustion air, e.g., OFA air, downstream of the primary combustion zone to reduce NOx in the flue gas of a boiler. In staged combustion, a portion of the air required to complete combustion (overfire air) is injected downstream of the primary combustion process, such as where the flue gas products of primary combustion have cooled to approximately 2400° F. to 2600° F. The nitrogen agent in gaseous form or small droplets (<50 about microns)

in an aqueous solution is introduced together with the staged air into the extremely hot flue gas. The staged combustion air and nitrogen agent are rapidly heated to the flue gas temperature of above 2000° F.

A surprising discovery has been made that NOx reduction can be achieved with SNCR by a release of a gaseous or small droplet nitrogen agent into an area at or near the OFA injector, where the bulk flue gas temperature is too hot for optimal SNCR. A nitrogen agent of gaseous ammonia or small droplets, e.g., average diameter of less than about 50 microns, is injected into the OFA system prior to or simultaneous with the mixing of OFA air with the NOx containing flue gas. The nitrogen agent gas or small droplets provides a quick nitrogen reagent release, such as in a period less than about 0.1 to 0.3 second. The nitrogen release occurs as the relatively cool nitrogen agent and overfire air mixture is heated by flue gases through an optimal temperature window for SNCR and to hotter temperatures. The nitrogen may be within the optimal temperature window for a brief period, e.g., 0.1 to 0.3 seconds. By introducing the nitrogen agent as a gas or small droplets, the agent is quickly released during the brief period of the optimal temperature window. The quick release ensures that the nitrogen agent contacts NOx in the flue gas when the agent is within the optimal temperature window. In addition, the release occurs close to the overfire air injector outlet, where vigorous mixing occurs between overfire air jet and flue gas streams.

Preferably, the droplet size of the agent is adjusted so that the average droplet lifetime in the flue gas and OFA is approximately equal to the period of the optimal temperature window and/or the period during which the overfire air mixes with the combustion flue gas. In general, a suitable initial average size of the droplets injected into the overfire air is less than about 50 microns in diameter. The preferred droplet size is a size of the droplets as injected into the overfire air, e.g., the size of the droplets before evaporation. Preferably, the average droplet lifetime is less than about one-tenth (0.1) to 0.3 of a second.

Figure 1:
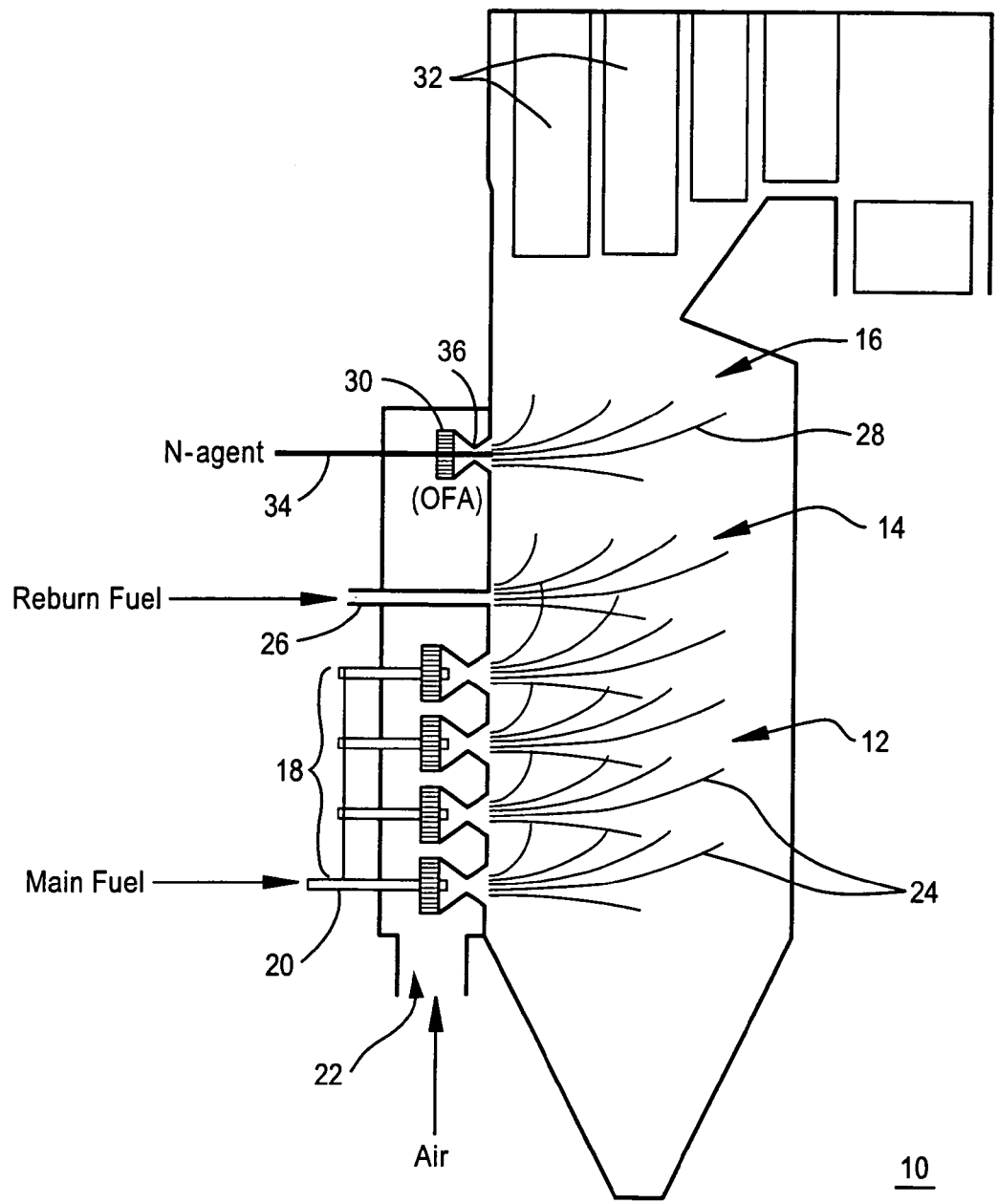
FIG. 1 is a schematic side view of a combustion system having an nitrogen agent injector in an overfire air port.

FIG. 1 is a schematic representation of a combustion system 10 such as used in a coal-fired boiler and adapted for the methods of the present invention. The combustion system 10 includes a combustion zone 12, a reburn zone 14 and a burnout zone 16. The combustion zone 12 is equipped with at least one, and preferably a plurality, of main burners 18 which are supplied with a main fuel such as coal through a fuel input 20 and with air through an air input 22. The main fuel is burned in combustion zone 12 to form a combustion flue gas 24 that flows from combustion zone toward burnout zone 16, in a "downstream direction".

If there is no reburn zone, then all of the heat source, e.g., coal, is injected into the combustion zone through the main burners 18. When a reburn zone 14 is included in the combustion system, typically about 70% to 95% of the total heat input is supplied through main burners 18 and the remaining 5% to 30% of heat is supplied by injecting a reburn fuel, such as natural gas, coal or oil through a reburn fuel input 26. Downstream of combustion and reburn zones, overfire air (OFA) 28 is injected through an overfire air input 30 into the OFA burnout zone 16. Downstream of the burnout zone, the combustion flue gas 24 passes through a series of heat exchangers 32 and a particulate control device (not shown), such as an electrostatic precipitator (ESP) or baghouse, that removes solid particles from the flue gas, such as fly ash.

Combustion flue gas 24 is formed by burning conventional fuels, e.g., coal, in any of a variety of conventional combustion systems. The burnout zone 16 is formed by injecting overfire air 28 in a region of the combustion system downstream, i.e., in the direction of combustion flue gas flow, from the combustion zone. Combustion devices that include a combustion zone for oxidizing a combustible fuel and a burnout zone can be adapted to receive a mixture of a nitrogen reducing agent and overfire air as a means to reduce NOx emissions. For example, the combustion and burnout zones may be provided in a power plant, boiler, furnace, magnetohydrodynamic (MHD) combustor, incinerator, engine, or other combustion device.

A selective reducing agent (nitrogen agent or N-agent) 34 is injected into to the overfire air prior to or concurrently with injection of the overfire air 28 into the burnout zone 16. The nitrogen agent may be injected through a center nozzle 36 or other injection system into the center of the OFA air flow, e.g., OFA inlet port 30 connection to the flue gas stream. The OFA port 30 may comprise inlet ports at the corners of the boiler and where the ports are at the same elevation in the boiler. The nozzle 36 may inject that nitrogen agent at the inlet of the OFA to the flue gas stream or substantially upstream of the inlet and well before the OFA mixes with the flue gas. Aqueous solutions of the selective reducing agent can be injected into the OFA air using conventional injection systems commonly used to generate small droplets. The nitrogen-agents can be injected by gas-liquid injectors such as various atomizers. Suitable atomizers include dual-fluid atomizers that use air or steam as the atomizing medium, as well as suitably designed pressure atomizers.

The nitrogen-agent injection system 36 may be capable of providing droplets with an average size that can be adjusted. The initial average size distribution of the spray droplets may be substantially monodisperse, e.g., having fewer than about 10% of the droplets with droplet sizes (i.e., diameter) less than about half the average droplet size, and fewer than about 10% of the droplets having a droplet size of greater than about 1.5 times the average droplet size. The average size of the droplets injected into the OFA can be determined, by selecting droplet sizes that optimize the droplet evaporation time from the nitrogen agent.

The terms nitrogen oxides and NOx are used interchangeably to refer to the chemical species nitric oxide (NO) and nitrogen dioxide ($NO_2$). Other oxides of nitrogen are known, such as $N_2O$, $N_2O_3$, $N_2O_4$ and $N_2O_5$, but these species are not emitted in significant quantities from stationary combustion sources (except $N_2O$ in some combustion systems). The term nitrogen oxides (NOx) is used generally to encompass all binary N—O compounds, However, NOx also particularly refers to the NO and $NO_2$.

The terms selective reducing agent and nitrogen agent are used interchangeably to refer to any of a variety of chemical species capable of selectively reducing NOx in the presence of oxygen in a combustion system. In general, suitable selective reducing agents include urea, ammonia, cyanuric acid, hydrazine, thanolamine, biuret, triuret, ammelide, ammonium salts of organic acids, ammonium salts of inorganic acids, and the like. Specific examples of ammonium salt reducing agents include, ammonium sulfate, ammonium bisulfate, ammonium bisulfite, ammonium formate, ammonium carbonate, ammonium bicarbonate, and the like. Mixtures of these selective reducing agents can also be used. The selective reducing agent can be provided in a solution, preferably an aqueous solution or as a gas. One preferred selective reducing agent is urea in aqueous solution.

Locating a gaseous or small droplet SNCR injection system with the overfire injection system is generally convenient and avoids the cramped and hot space at the primary combustion zone of a boiler or furnace. Using overfire air to introduce a nitrogen agent allows the gas and/or droplets of the agent solution to be injected into an NOx containing flue gas and then quickly heated to a temperature appropriate for SNCR NOx reduction without the expense and downtime of installing an injection system in a high temperature region of the boiler, furnace or other combustion system.

The stoichiometric ratio of the amount of selective reducing agent in the overfire air to the amount of NOx in the flue gas being treated is about 0.4 to about 10, and preferably about 0.7 to about 3. The stoichiometric ratio is the ratio of number of moles of nitrogen atoms in the selective reducing agent to number of moles of nitrogen atoms in the NOx.

The selective reducing agent may be provided in an aqueous solution in optimized drop form, or in a gas that is injected into the overfire air before injection of the overfire air into the reburn zone, concurrently with injection of the OFA air into the reburn zone, or both. The nitrogen-agent solution or gas may also be injected into the OFA of a combustion system without reburning. The nitrogen-agent aqueous solution can contain the selective reducing agent in any suitable concentration, such as from about 5% to about 90% by weight. A preferred concentration range for urea is about 10% to about 50% by weight.

The nitrogen-agents can be injected with the OFA without previously injecting reburning fuel into the flue gas. Further, the N-agents can be injected with recirculated flue gas which can serve the same purpose as OFA. For example, recirculated flue gas enriched by oxygen or air can be injected along with the N-agents through the same or separate injectors.

Figure 2:
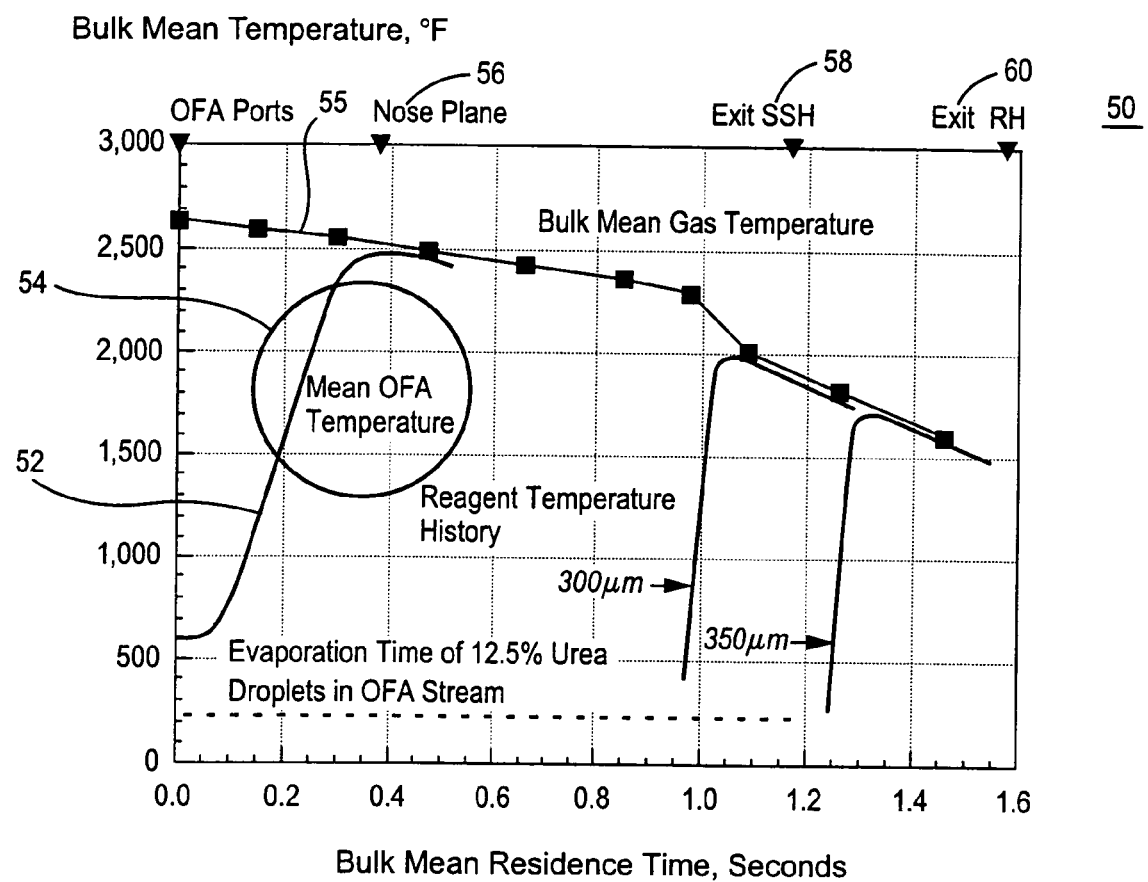
FIG. 2 is a graph of combustion flue gas temperature vs. time.
Figure 3:
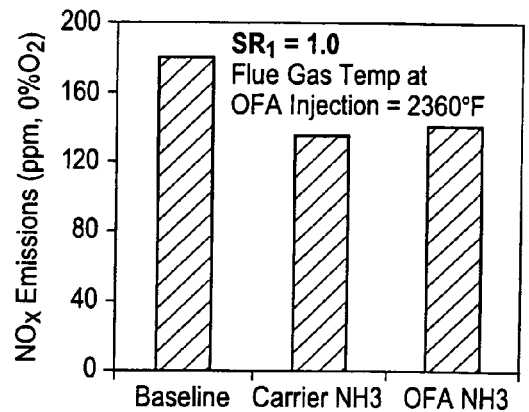
FIGS. 3 to 6 are charts showing the effect on NOx emission levels due to injection of a gaseous nitrogen agent ($NH_3$) at different stoichiometric ratios and different flue gas temperatures.
Figure 4:
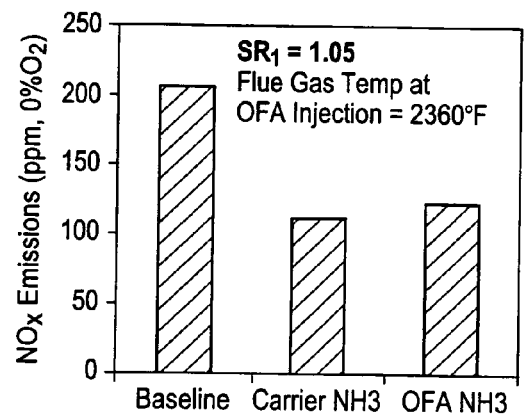
Figure 5:
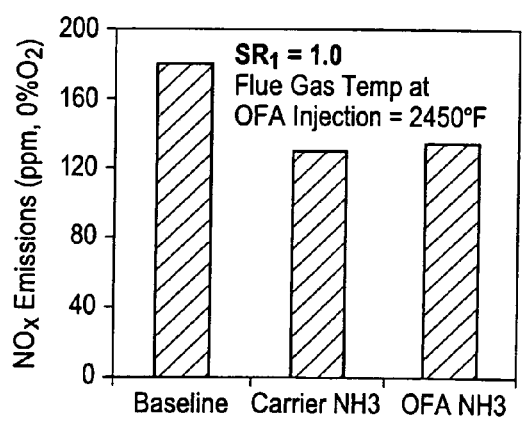
Figure 6:
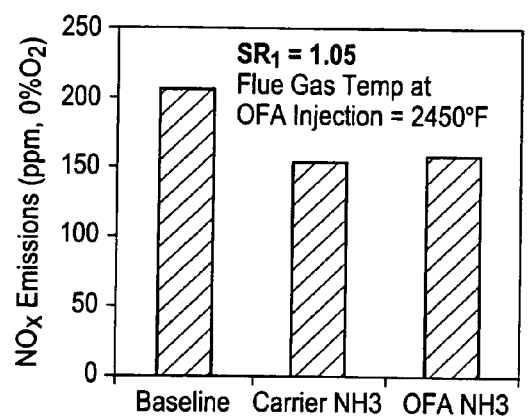

FIG. 2 is a graph 50 showing the residence time of a nitrogen agent in OFA and flue gas verses gas temperature. As represented by the plot 52 of mean OFA temperature for a nitrogen agent having droplets smaller than 50 microns, the mixture of nitrogen agent and OFA air increases from about 600° F. to 2,500° F. in about 0.4 second as the mixture enters the flue gas from the OFA port 30. As the overfire air, nitrogen agent and flue gas mix, the nitrogen agent is heated through a temperature window 54 that is optimal for SNCR, e.g., 1,600° F. to 2,000° F. This temperature window is brief, e.g., about 0.1 or 0.2 seconds.

During the brief temperature widow 54 of optimal SNCR, the gaseous or small diameter nitrogen agent reduce substantial amounts of NOx in the flue gas. The reduction of NOx is further promoted if the OFA and flue gas vigorously mix at the same time that the nitrogen agent is heated through the optimal temperature window. Vigorous mixing and rapid OFA heating generally occur as the overfire air enters the flue gas from the OFA inlet port 30. Accordingly, the reduction of NOx due to SNCR occurs where the overfire air enters and mixes with the flue gas. Moreover, injecting the nitrogen agent through a nozzle 36 at the or near the OFA inlet port and/or aligned with the center of the overfire air stream seems to promote the reduction of NOx in the fuel gas. The OFA air shielding the nitrogen agent reacts initially with any residual carbon monoxide (CO) that would otherwise interfere with the SNCR chemistry.

The nitrogen agent and OFA are quickly heated by the flue gas (see plot 55) to a temperature beyond the optimal SNCR window 54. Much of the NOx in the flue gas has already been reduced when the OFA and any remaining nitrogen agent are heated to the 2,500° F. flue gas temperature (see where plot 52 of the OFA merges with plot 55 of the flue gas) which is too hot for optimal SNCR. As the flue gas 55 cools to 2,000° F. and below, it flows beyond the nose plane 56 of the combustion system, e.g., a boiler, and to the super-saturated steam (SSH) unit 58 and steam reheat (RH) unit 60 that receive the flue gas passing out of the boiler.

Tests of NOX performance with gaseous ammonia injection into overfire air were performed in 1.0 MMBTU/hr Boiler Simulator Facility (BSF) which provides an accurate sub-scale simulation of the flue gas temperatures and compositions found in a full-scale boiler. The BSF is described in U.S. Pat. No. 6,280,695. For the tests, the BSF was fired on natural gas. A specially constructed overfire air injector was placed at a specific flue gas temperature. The injector consisted of an axial nitrogen carrier tube with an ID of 1.875 inches surrounded by an annular overfire air tube with an inside diameter (ID) of 0.25 inches. Ammonia was added to either the nitrogen carrier or overfire air stream to reduce NOx emissions. The injector was aligned on the BSF centerline and aimed downward (i.e., co-current with the flue gas).

Primary flame stoichiometric ratio ($SR_1$) in tests was 1.0 and 1.05. Sufficient OFA was injected to maintain final SR ($SR_3$) constant at 1.20 which corresponds to about 3% excess $O_2$ in flue gas. These conditions were defined as baseline. The BSF burner system at baseline conditions generated controlled initial NOx levels of 185 ppm and 205 ppm at 0% $O_2$ at $SR_1$ equaled 1.0 and 1.05, respectively. $SR_1$ is stoichiometric air to fuel ratio in the primary combustion zone 12; $SR_2$ is the same ratio but in the reburn zone 14, and $SR_3$ is the stoichiometric ratio in the burnout zone 16. OFA was injected at flue gas temperatures of 2450° F. and 2350° F. Gaseous ammonia was injected at a concentration ratio (NSR) of 1.5. The concentration ratio (NSR) is the ratio of moles of atoms of nitrogen in the ammonia to moles of atoms of nitrogen in NOx.

The Baseline, Carrier $NH_3$ and OFA $NH_3$ NOx emission levels shown on the charts of FIGS. 3 to 6 relate to tests conducted in the BSF under similar conditions, except that: the Baseline bar relates to tests conducted without a nitrogen agent; the Carrier $NH_3$ bar relates to injection of the nitrogen agent gas ($NH_3$) along with nitrogen as a carrier down a center-pipe injector that discharges the agent into the center of the overfire air as they both enter the flue gas, and the OFA $NH_3$ bar relates to the injection of a nitrogen agent gas in with the overfire air before they both mix with flue gas.

FIGS. 3 to 6 show the effect of gaseous ammonia injection via the OFA port on NOx emissions. Baseline NOx concentration was lower for $SR_1$ equal to 1.0 than when $SR_1$ was equal 1.05 as is shown by a comparison of the bar chart of test data taken out $SR_1$=1.0 shown in FIG. 3 with the chart of data taken at $SR_1$=1.05 shown in FIG. 4. A similar comparison is made with respect to FIGS. 5 and 6. The test results demonstrate that injection of gaseous ammonia ($NH_3$) into the OFA results in 20% to 45% NOx reduction, depending upon the flue gas temperature at the point of overfire air injection and upon the main burner stoichiometry ($SR_1$). Better performance was achieved at when the overfire air was injected at cooler flue gas temperatures. $NH_3$ injection through center of the OFA port using nitrogen gas as a carrier provided slightly better NOx reduction than injection of the ammonia ($NH_3$) into the overfire air stream before the OFA stream mixed with the flue gas.

A computational Fluid Dynamics (CFD) analysis was performed to predict SNCR performance. The CFD model solved the transport equations for continuity, momentum, energy and species. The appropriate models were applied to solve turbulence, radiation, discrete phase trajectories and combustion. For the CFD study, a 160 MW tangential-fired boiler was evaluated with a nitrogen reagent injected into the overfire air injectors at different operating conditions. Prior to simulating the nitrogen reagent injection process, the CFD model was validated using baseline field test data and mean temperature profiles from a in-house thermal model for full load operating conditions. The flue gas flow profiles into the injector region of the model were based on those from the physical flow modeling test results.

The CFD model was run for various operating conditions to investigate the impact of reagent droplet size, firing rate reflected by the gas temperature immediately below the OFA injector, CO concentration below the OFA injector, and the stoichiometric ratio of reagent nitrogen to baseline NOx nitrogen (NSR) on SNCR NOx trim performance. In this case, NOx trim refers to NOx reduction exceeding that for pure overfire air conditions.

Figure 8:
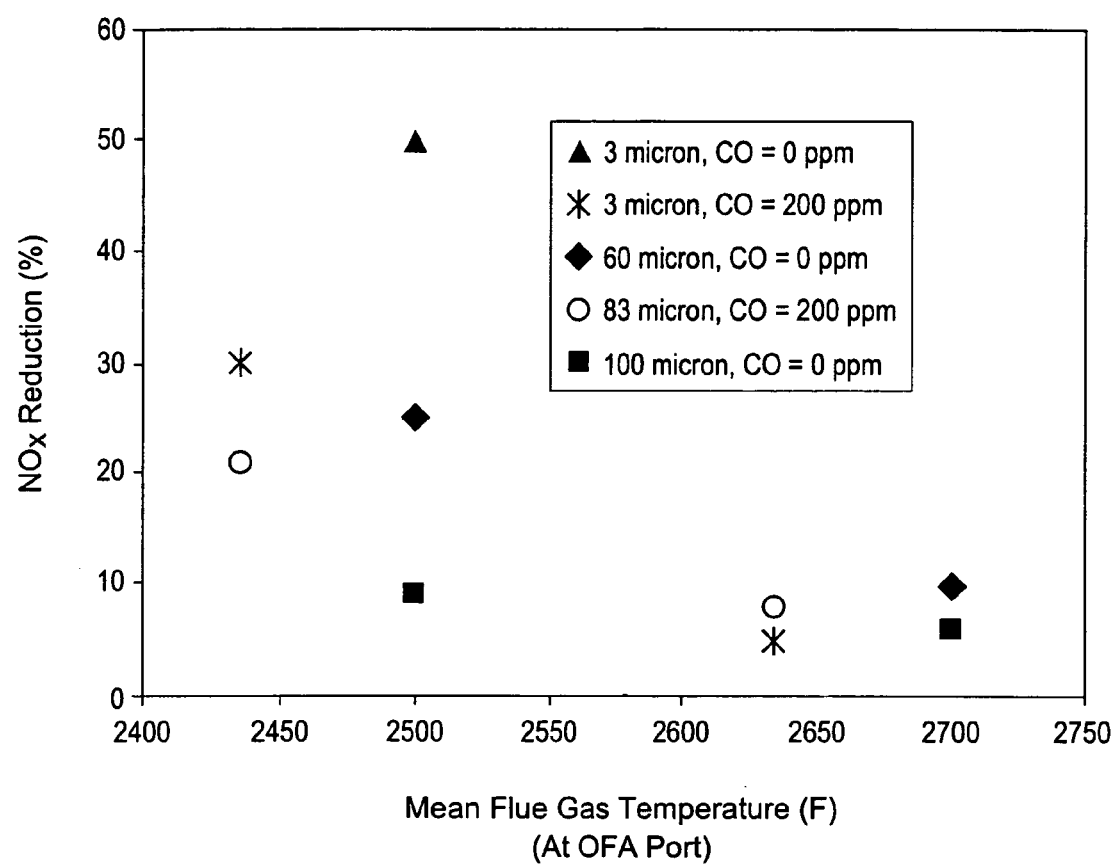
FIG. 8 is a chart of computer generated predictions of NOx emission reductions for various nitrogen agent droplet sizes and flue gas temperatures.

FIGS. 7 and 8 show predicted NOx trim (emission reduction) performance from the CFD model at different boiler process conditions. The NOx reduction process is most effective for flue gas temperatures less than about 2500° F. at the OFA injection port and at a CO concentration of zero. For flue gas temperatures (at the OFA port) less than 2500° F. and CO concentrations 200 ppmv and below, NOx trim increases (wherein a reduction of NOx emission occurs) as the nitrogen agent droplet size decreases, indicating that nitrogen reagent released near the OFA injectors at the flue gas/OFA mixing zone (e.g., burnout zone 16) is effective in reducing NOx.

Both pilot-scale experiments and CFD results show that injecting small droplets (having an average diameter of less than about 50 to 60 microns) into overfire air permits reagent release in the flue gas/overfire air mixing front improving NOX trim relative to droplet sizes greater than about 50 microns.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of decreasing the concentration of nitrogen oxides in a combustion flue gas comprising:
   a. forming a combustion flue gas in a combustion zone, the combustion flue gas comprising nitrogen oxides;
   b. introducing overfire air and the droplets of a solution or particles of a selective reducing agent in a burnout zone;
   c. mixing the overfire air and the selective reducing agent with the combustion flue gas in the burnout zone at a flue gas temperature above an optimal temperature range for reduction of the nitrogen oxides using the reducing agent, wherein the optional temperature range is above 1600° F.;
   d. heating with the combustion flue gas, the overfire air and the droplets or particles of the selective reducing agent to the optimal temperature range;
   e. reducing the nitrogen oxides with the selective reducing agent heated to the optimal temperature range, and
   f. continuing to increase the temperature of the overfire air and the selective reducing agent beyond the optimal temperature range with the flue gas.

2. The method of claim 1 wherein the optimal temperature range during step (d) occurs in a brief period of less than 0.3 second and the reduction of the nitrogen oxides occurs during the brief period.

3. The method of claim 1 wherein the droplets or particles have an average size of no greater than 60 microns.

4. The method of claim 1 wherein the small average size of droplets or particles is no greater than 50 microns.

5. The method of claim 1, wherein the step of mixing the overfire air and the selective reducing agent with the combustion flue gas occurs as the flue gas is in a temperature range of about 2500° F. to about 2000° F., and the optimal temperature range is 1600° F. to less than 2000° F.

6. The method of claim 1, wherein the step of providing the overfire air and the selective reducing agent comprises adding the selective reducing agent to the overfire air concurrently with injecting overfire air into the combustion flue gas in the burnout zone.

7. The method of claim 1, wherein the step of providing the overfire air and the selective reducing agent comprises adding the selective reducing agent to the overfire air prior to injecting the overfire air into the burnout zone.

8. The method of claim 1, wherein the selective reducing agent is injected into a center portion of a stream of overfire air.

9. The method of claim 1, wherein the selective reducing agent is injected into an upper portion of a stream of overfire air.

10. The method of claim 1, wherein the selective reducing agent reduces the nitrogen oxides when the flue gas is at an average temperature above 2000° F., and the mixture of flue gas, overfire air and reducing agent is at an average temperature of about 1600° F. to about 2000° F.

11. The method of claim 1, wherein the solution is an aqueous solution.

12. The method of claim 1, wherein the selective reducing agent is provided in a stoichiometric ratio of about 0.4 to about 10, wherein the stoichiometric ratio is a ratio of moles of atoms of nitrogen in the selective reducing agent to moles of atoms of nitrogen in the nitrogen oxides.

13. The method of claim 12, wherein the stoichiometric ratio is in a range of 0.7 to 3.

14. The method of claim 1, wherein the droplets are formed to have an initial average size distribution with fewer than about 10% of the droplets having a droplet size greater than about 1.5 times an average droplet size.

15. The method of claim 1, wherein the mixture of overfire air and droplets of a solution or gas of the selective reducing agent is formed by injecting the droplets into the overfire air.

16. The method of claim 1, wherein the concentration of the selective reducing agent in the solution is about 5% by weight to about 90% by weight.

17. The method of claim 1, wherein the overfire air is injected through at least two ports located at different levels with selective reducing agent injected through an upper port of said at least two ports.

18. The method of claim 1, wherein then overfire air is a recirculating $O_2$ enriched flue gas.

19. A method of decreasing the concentration of nitrogen oxides in a combustion flue gas, comprising:
   (a) forming a combustion flue gas in a combustion zone, the combustion flue gas comprising nitrogen oxides;
   (b) providing overfire air and droplets of an aqueous of a selective reducing agent in a burnout zone, the droplets or particles having an initial average size of less than 50 microns;
   (c) introducing the overfire air and the selective reducing agent into combustion flue gas in the burnout zone at the flue gas temperature above 2000 degrees F.;
   (d) mixing the overfire air and the selective reducing agent with the combustion flue gas in the burnout zone at a flue gas temperature above an optimal temperature range for reduction of the nitrogen oxides using the reducing agent, wherein the optional temperature range is above 1600° F.;

(e) heating with the combustion flue gas, the overfire air and the droplets or particles of the selective reducing agent to the optimal temperature range;
(f) decreasing the concentration of nitrogen oxides in the flue gas by reducing the nitrogen oxides with the selective reducing agent, and
(g) continuing to increase the temperature of the overfire air and the selective reducing agent beyond the optimal temperature range with the flue gas.

20. The method of claim 19, wherein the selective reducing agent is selected from a group consisting of urea, ammonia, ammonium salts of organic acids, ammonium salts of inorganic acids, and mixtures thereof.

21. The method of claim 19, wherein the step of providing the overfire air and the selective reducing agent comprises adding the selective reducing agent to the overfire air concurrently with injection of the overfire air into the burnout zone.

22. The method of claim 19, wherein the step of providing the overfire air and the selective reducing agent comprises adding the selective reducing agent to the overfire air prior to the introduction of the overfire air into the burnout zone.

23. The method of claim 19, wherein the selective reducing agent, and overfire air, and flue gas form a mixture having a temperature briefly in a range of about 1600° F. to about 2000° F. and said decrease in the concentration occurs while the mixture temperature is in said range, and the flue gas in the burnout zone has a temperature above 2000° F.

24. The method of claim 19, wherein the overfire air is introduced through at least two ports located at different levels of said burnout zone, and said selective reducing agent is injected through an upper port of said at least two ports.

* * * * *

UNITED STATES PATENT AND TRADEMARK OFFICE
CERTIFICATE OF CORRECTION

| | | |
|---|---|---|
| PATENT NO. | : 7,374,736 B2 | |
| APPLICATION NO. | : 10/705820 | |
| DATED | : May 20, 2008 | |
| INVENTOR(S) | : Roy Payne et al. | |

It is certified that error appears in the above-identified patent and that said Letters Patent is hereby corrected as shown below:

On the Title Page (74) change the name "Vanerhye" to the name --Vanderhye--.

On the Title Page (57), third line, change the word "mixes" to the word --mix--.

In column 7, line 44 change the word "in" to the word --to--.

In column 7, line 50 change the word "optional" to the word --optimal--.

In column 7 line 61 delete the phrase "during step (d)".

In column 7 line 62 after the word "occurs" insert the phrase --at least partially--.

In column 7 line 66 change the numeral "1" to the numeral --3-- and delete the word "small".

In column 8 line 4 delete the first occurrence of the word "about" and change the second occurrence of the word "about" to the word --above--.

In column 8 line 22 before the word "flue" insert the word --the--.

In column 8 line 23 before the word "overfire" insert the word --the-- and before the word "reducing" insert the word --the--.

UNITED STATES PATENT AND TRADEMARK OFFICE
CERTIFICATE OF CORRECTION

PATENT NO. : 7,374,736 B2
APPLICATION NO. : 10/705820
DATED : May 20, 2008
INVENTOR(S) : Roy Payne et al.

It is certified that error appears in the above-identified patent and that said Letters Patent is hereby corrected as shown below:

In column 8 line 39 delete the phrase "or gas".

In column 8 line 55 after the word "droplets" delete the phrase "of an aqueous" and insert the phase --or particles--.

In column 8 line 61 change the word "the" to the word --a--.

In column 8 line 66 change the word "optional" to the word --optimal--.

Signed and Sealed this

Twelfth Day of August, 2008

JON W. DUDAS
*Director of the United States Patent and Trademark Office*